(12) United States Patent
Witte

(10) Patent No.: US 11,714,614 B2
(45) Date of Patent: Aug. 1, 2023

(54) CODE GENERATION TOOL FOR CLOUD-NATIVE HIGH-PERFORMANCE COMPUTING

(71) Applicant: Microsoft Technology Licensing, LLC, Redmond, WA (US)

(72) Inventor: Philipp Andre Witte, Belleuve, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 17/321,137

(22) Filed: May 14, 2021

(65) Prior Publication Data
US 2022/0261227 A1 Aug. 18, 2022

Related U.S. Application Data

(60) Provisional application No. 63/150,146, filed on Feb. 17, 2021.

(51) Int. Cl.
*G06F 9/44* (2018.01)
*G06F 8/40* (2018.01)
(Continued)

(52) U.S. Cl.
CPC .............. *G06F 8/40* (2013.01); *G06F 8/30* (2013.01); *G06F 9/48* (2013.01)

(58) Field of Classification Search
CPC .............. G06F 8/30; G06F 8/40; G06F 9/48
(Continued)

(56) References Cited

U.S. PATENT DOCUMENTS 8,060,857 B2* 11/2011 Biggerstaff .............. G06F 8/76
717/136
10,791,134 B2* 9/2020 Gervais .................. G06F 21/604
(Continued)

OTHER PUBLICATIONS

Chen et al., "Case Study: An infrastructure for C/ATLAS Environments with Object-oriented Design and XML Representation", 2002, Elsevier Inc., pp. 83-95. (Year: 2002).*
(Continued)

*Primary Examiner* — Ted T. Vo
(74) *Attorney, Agent, or Firm* — Barta, Jones & Foley, PLLC

(57) ABSTRACT

Methods, storage media, and systems for translating a software expression from a user application programming interface (API) call to an API call of a software development kit (SDK) are disclosed. Some examples may include: receiving a tagged expression indicating that a translation of the software expression from a user API call to an API call of an SDK is to be performed, the SDK being associated with a cloud-native high-performance computing environment, processing an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree and providing the serialized abstract syntax tree and one or more resource files to the cloud-native high-performance computing environment for execution.

20 Claims, 12 Drawing Sheets

(51) Int. Cl.
*G06F 8/30* (2018.01)
*G06F 9/48* (2006.01)

(58) Field of Classification Search
USPC .......................................... 717/136, 140–144
See application file for complete search history.

(56) References Cited

U.S. PATENT DOCUMENTS

| | | | | |
|---|---|---|---|---|
| 11,061,652 | B1 * | 7/2021 | Biswas | G06F 8/427 |
| 11,188,390 | B2 * | 11/2021 | Brebner | G06F 9/5055 |
| 2020/0192646 | A1 | 6/2020 | Yerramreddy et al. | |

OTHER PUBLICATIONS

Janech et al., "The Architecture of Distributed Database System in the VANET Environment", 2014, Informtica, vol. 38, No. 3, pp. 205-211. (Year: 2014).*
"AWS Lambda: Developer Guide", Retrieved from: https://web.archive.org/web/20170327055315/https://docs.aws.amazon.com/lambda/latest/dg/lambda-dg.pdf, Mar. 27, 2017, 314 Pages.
"International Search Report and Written Opinion Issued in PCT Application No. PCT/US22/011883", dated Apr. 29, 2022, 12 Pages.
Zhang, et al., "Kappa: A Programming Framework for Serverless Computing", In Proceedings of the 11th ACM Symposium on Cloud Computing, Oct. 19, 2020, pp. 328-343.
"Azure Batch", Retrieved from: https://web.archive.org/web/20200616223121/https://azure.microsoft.com/en-us/services/batch/, Jun. 16, 2020, 13 Pages.
"Azure CycleCloud", Retrieved From https://web.archive.org/web/20201218061421/https://azure.microsoft.com/en-us/features/azure-cyclecloud/, Dec. 18, 2020, 12 Pages.
"Azure Functions", Retrieved from: https://azure.microsoft.com/en-in/services/functions/, Nov. 12, 2020, 21 Pages.
"Chevron Energy Technology Company", Retrieved From https://github.com/ChevronETC, Retrieved on Jan. 6, 2021, 4 Pages.
"Dask Natively Scales Python", Retrieved From https://dask.org/, Nov. 17, 2020, 5 Pages.
"Distributed Computing", Retrieved From https://web.archive.org/web/20200530075116/https7/docs.julialang.org/en/V1/stdlib/Distributed/, May 30, 2020, 23 Pages.
"Julia 1.5 Documentation", Retrieved From https://web.archive.org/web/20200929115200/https://docs.julialang.org/en/v1/, Sep. 29, 2020, 3 Pages.
"Julia Micro-Benchmarks", Retrieved From https://web.archive.org/web/20201226234730/https://julialang.org/benchmarks/, Dec. 26, 2020, 2 Pages.
"MPI Forum", Retrieved From https://web.archive.org/web/20201229035708/https://www.mpi-forum.org/, Dec. 20, 2020, 3 Pages.
"Production-Grade Container Orchestration—Kubernetes", Retrieved From: https://web.archive.org/web/20200415024744/https://kubernetes.io/, Apr. 15, 2020, 5 Pages.
"SeismicJulia", Retrieved From https://web.archive.org/web/20200813134234/https://github.com/SeismicJulia, Aug. 13, 2020, 2 Pages.
Arakaki, et al., "JuliaPy / pyjulia", Retrieved From https://github.com/JuliaPy/pyjulia, Nov. 29, 2020, 2 Pages.
Arthur, et al., "JuliaParallel / ClusterManagers.jl", Retrieved From https://github.com/JuliaParallel/ClusterManagers.jl, Feb. 19, 2021, 6 Pages.
Carreira, et al., "Cirrus: a Serverless Framework for End-to-end ML Workflows", In Proceedings of ACM Symposium on Cloud Computing, Nov. 20-23, 2019, pp. 13-24.
Fouladi, et al., "From Laptop to Lambda: Outsourcing Everyday Jobs to Thousands of Transient Functional Containers", In Proceedings of the USENIX Annual Technical Conference, Jul. 10-12, 2019, 15 Pages.
Gailey, et al., "Create a Function on Linux using a Custom Container", Retrieved From https://docs.microsoft.com/en-us/azure/azure-functions/functions-create-function-linux-custom-image?tabs=bash%2Cportal&pivots=programming-language-python, Feb. 12, 2020, 19 Pages.
Johnson, et al., "JuliaPy / PyCall.jl", Retrieved From https://github.com/JuliaPy/PyCall.jl, Jan. 8, 2021, 14 Pages.
Kaplan, et al., "ChevronETC / Examples", Retrieved From https://github.com/ChevronETC/Examples, Dec. 10, 2020, 2 Pages.
Laul, Mart, "How Much Money Can You Save By Going Serverless?", Retrieved From https://dashbird.io/blog/saving-money-switching-serverless/, Apr. 17, 2020, 6 Pages.
Louboutin, Mathias, "slimgroup / JUDI.jl", Retrieved From https://github.com/slimgroup/JUDI.jl, Retrieved on Jan. 6, 2021, 9 Pages.
Lynley, Matthew, "The Cloud Dictionary of Pain: Five Of AWS's Toughest Cloud Topics", Retrieved From https://acloudguru.com/blog/engineering/the-cloud-dictionary-of-pain-five-of-awss-toughest-cloud-topics, Mar. 21, 2021, 14 Pages.
Minack, Enrico, "horovod / horovod", Retrieved From https://web.archive.org/web/20201225034654/https://github.com/horovod/horovod, Dec. 25, 2020, 10 Pages.
Shankar, et al., "numpywren: Serverless Linear Algebra", In Technical Report No. UCB/EECS-2018-137, Oct. 22, 2018, 16 Pages.
Tramer, et al., "Azure-Samples / batch-python-quickstart", Retrieved From https://github.com/Azure-Samples/batch-python-quickstart/blob/master/src/python_quickstart_client.py, Jul. 1, 2019, 8 Pages.
"Devito: Symbolic Finite Difference Computation", Retrieved from : https://www.devitoproject.org/, Jan. 1, 2016, 3 Pages.

* cited by examiner

| USER API | CODE GENERATOR | CLOUD API CALLS |
| --- | --- | --- |
| Platform Independent | Platform Independent | Platform Dependent |
| MACRO: @bcast *expr* | • Create object storage container | • Create Azure/AWS/GCP storage container |
| Function | • Expand expression into macro that: | • Upload expression to object storage |
| • Upload expression to cloud object storage to make available to batch workers/serverless functions | • Serializes expression<br>• Creates required cloud resource bindings<br>• Returns a future to user (reference to object storage) | • Create batch resource file from object storage |
| 304 | 306 | 308 |

*Fig. 3*

| USER API | CODE GENERATOR | CLOUD API CALLS |
| --- | --- | --- |
| Platform Independent | Platform Independent | Platform Dependent |
| MACRO: @batchdef *expr*<br><br>Function<br>• Execute expression on local machine and on subsequent batch workers and/or serverless functions | • Append expression (its abstract syntax tree) to a global state variable<br>• Expressions in state variable are serialized + uploaded to object storage when users call @batchexec | • None |
| 404 | 406 | 408 |

*Fig. 4*

CODE GENERATION TOOL FOR CLOUD-NATIVE HIGH-PERFORMANCE COMPUTING

CROSS-REFERENCE TO RELATED APPLICATIONS

The present disclosure claims priority to U.S. Provisional Patent Application No. 63/150,146 filed Feb. 17, 2021, the disclosure of which is hereby incorporated by reference in its entirety.

BACKGROUND

Large-scale data-parallel optimization problems represent one of the most computationally challenging sets of scientific computing problems due to the high dimensionality of the unknown models and the large amounts of data involved. Traditionally, these workloads are deployed to on-premise high-performance computing (HPC) clusters and take advantage of massively shared file systems, fast inter-node connections, and highly resilient resources. The default approach for running these applications in the cloud is to replicate on-premise HPC clusters with on-demand infrastructure as a service (IaaS) resources such as HPC virtual machines and parallel file systems. These on-premise and cloud-based cluster solutions come with high cost, low resilience, and increased management overhead. While some implementation services make cluster management and deployment more convenient, users are still responsible for selecting the right set of resources and managing the cluster throughout the cluster's lifetime. A large burden is placed on the user, who is often a domain-specialist without extensive HPC knowledge.

Aside from the administrative complexity, on-demand clusters also suffer from shortcomings related to resilience and cost. While cluster management tools support elasticity and manage resilience, most applications running on clusters utilize a message passing interface (MPI) and do not support elasticity themselves. Unless an application has been specifically implemented to handle resilience, it cannot actually take advantage of resilience provided by a cloud platform. A similar limitation is true in terms of cost. Data-parallel optimization algorithms typically synchronize at a certain times during execution (e.g. to broadcast updates to all worker nodes), which leads to computational resources sitting temporarily idle. In principle, cloud services provide auto-scaling capabilities, but this is typically not supported by the application itself running on a cluster. The auto-scaling capabilities of services are therefore mainly used to scale resources in-between jobs and not to scale resources within an individual job itself.

An alternative for running HPC workloads in the energy space on dedicated (virtual) clusters, are serverless function as a service (FaaS) and semi-serverless approaches that include a combination of FaaS and platform as a service (PaaS). Objective functions of data-parallel optimization problems like seismic imaging are embarrassingly parallel to evaluate and therefore present a great opportunity to leverage batch processing tools. Because iterative optimization algorithms also involve a serial component (i.e. collecting the updates, updating weights/model parameters), batch processing can be combined with workflow management tools that can express and execute directed acyclic graphs (DAGs). This can be achieved through serverless services, which effectively replace a dedicated master node. Using a combination of batch processing and serverless computations offers several advantages for users, such as inherent resilience (as tasks of a batch job are processed independently), the possibility to add or remove nodes during runtime, leverage resource harvesting, and virtually unlimited scalability (as no synchronization between worker nodes and a master node is required). These advantages translate to considerable cost savings for users, as serverless approaches can maximize resource utilization and thus reduce some costs by up to ninety percent. Serverless workflow management furthermore removes the classic master nodes as a single point of failure and enables automatic resource allocation for the workflow execution.

While running large-scale data-parallel applications in a serverless and semi-serverless fashion provides many advantages, it requires that applications be fundamentally re-designed and re-implemented using multiple sets of potentially complex software development kits (SDKs). Furthermore, implementations become heavily platform-dependent and are not portable to other clouds or on-premise clusters. Having to implement serverless and semi-serverless approaches manually puts a large burden on the user and makes this approach not feasible for research and development purposes.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to a framework for providing distributed extensions that allow users to offload computations to the cloud in a serverless and semi-serverless fashion based on batch and serverless computing. More specifically, such a framework can be realized by extending packages for distributed computing in high-level languages like Python or Julia to cloud services such as but not limited to AWS/Azure Batch and Azure (Durable) Functions, AWS Lambda Functions or Google Cloud Functions. An additional layer of software abstraction is implemented on top of existing RESTful SDKs that allow users to offload computations to the cloud using remote procedure calls that resemble APIs for current (cluster-based) distributed packages. This enables users to run their code cloud-natively with minimal modifications to existing code using simple high-level code statements.

In accordance with examples of the present disclosure, users can efficiently run data-parallel applications using batch processing and serverless computations, enabling them to scale to large-scale problem sizes across multiple regions and reduce cost by up to ninety percent. Thus, users can implement a single version of a program that can be executed on a local PC, a dedicated cloud or on-premises cluster, and cloud-natively using various PaaS and FaaS offerings. Thus, the gap between the development and deployment stage can be narrowed, as the same program can be executed in different computing environments. In some implementations, a user can interact with the cloud in a fully serverless fashion, where users can offload any type of computations to the cloud without having to specify or manage resources and, equally important, without having to make significant modifications to existing code.

In accordance with aspects of the present disclosure, a method for translating a software expression from a user application programming interface (API) call to an API call of a software development kit (SDK) is described. The method may include receiving a tagged expression indicating that a translation of the software expression from a user API call to an API call of an SDK is to be performed, the SDK being associated with a cloud-native high-performance computing environment; processing an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree; and providing the serialized abstract syntax tree and one or more resource files to the cloud-native high-performance computing environment for execution.

In accordance with aspects of the present disclosure, a computer-readable storage medium including instructions, which when executed by a processor, cause the processor to translate a software expression from a user application programming interface (API) call to an API call of a software development kit (SDK) is described. The instructions, when executed by the processor, may cause the processor to: receive a tagged expression indicating that a translation of a software expression from a user API call to an API call of an SDK is to be performed, the SDK being associated with a cloud-native high-performance computing environment; process an abstract syntax tree associated with the software expression by replacing symbols in the abstract syntax tree with respective variables, replacing a return statement in the abstract syntax tree with a serialization instruction to write a result to local storage, and serializing the processed abstract syntax tree; and provide the serialized abstract syntax tree and one or more resource files to the cloud-native high-performance computing environment for execution.

In accordance with aspects of the present disclosure, a system is described. The system may include one or more hardware processors configured by machine-readable instructions to: receive a tagged expression indicating that a translation of a software expression from a user API call to an API call of an SDK is to be performed, the SDK being associated with a cloud-native high-performance computing environment; process an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree; and provide the serialized abstract syntax tree and one or more resource files to the cloud-native high-performance computing environment for execution.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 3 depicts details of a first macro expansion in accordance with examples of the present disclosure.

FIG. 4 depicts details of a second macro expansion in accordance with examples of the present disclosure.

DETAILED DESCRIPTION

Figure 1:
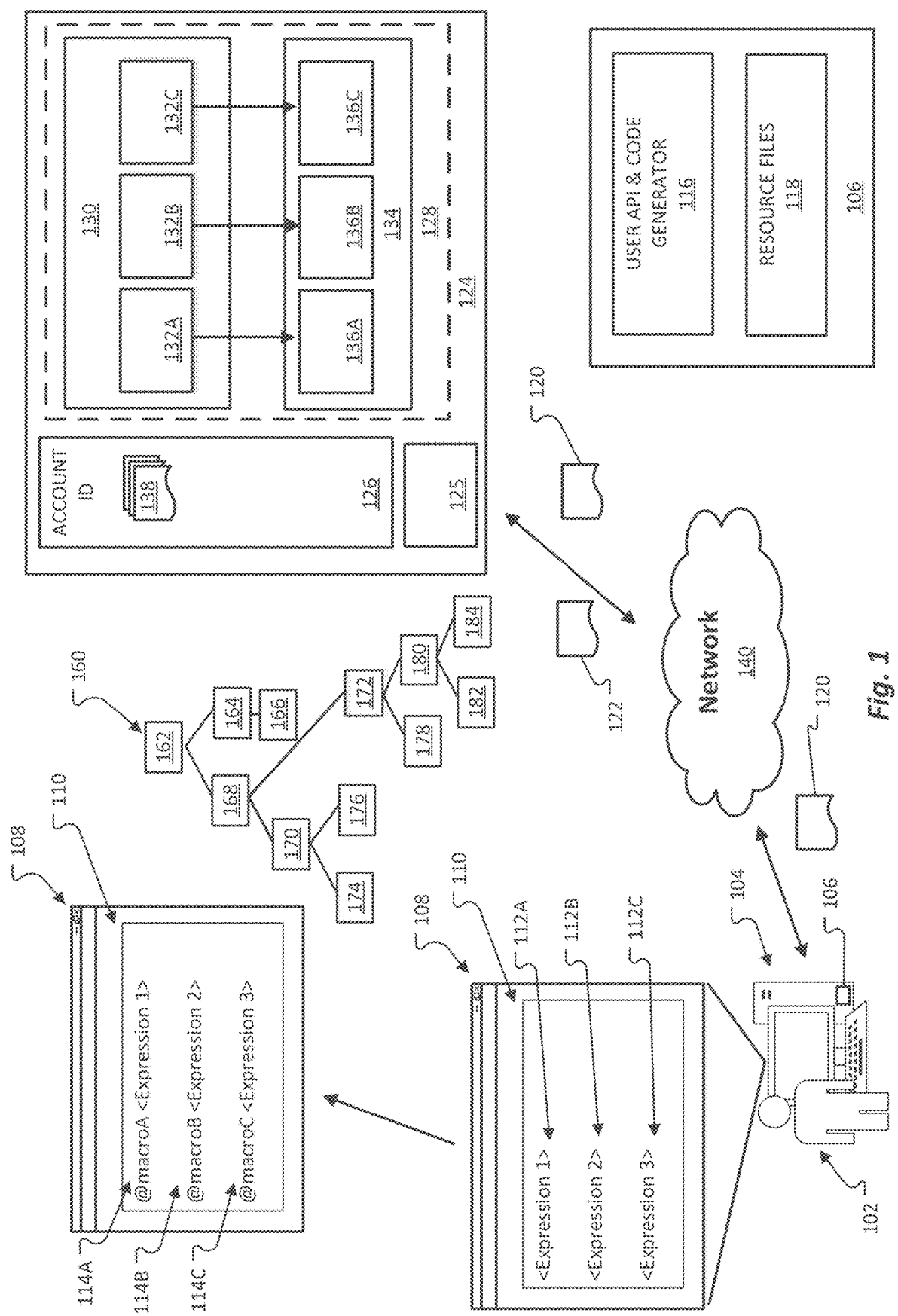
FIG. 1 depicts details of an operating environment for a code generation tool for a cloud-native high-performance computing environment in accordance with examples of the present disclosure.

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The traditional approach to distributed computing for scientific applications is based on two-sided communication, mainly via the message passing interface (MPI) standard. Many existing legacy programs and coding applications, for example in the energy space, are built on this paradigm and implemented in lower-level languages like Fortran or C. While the MPI standard offers very fine-grained control over communication patterns, it comes with a high level of complexity that often stifles innovation and makes code maintenance cumbersome. With the rise of higher-level programming languages like Python or Julia, one-sided communication has become the de-facto standard for parallelizing task-parallel applications. Unlike two-sided communication, users need to manage only the master process and utilize remote workers through remote function/procedure calls (RPCs).

In the cloud, distributed applications based on one-sided communication can be executed on a cluster of interconnected virtual machines (VMs). However, if users want to leverage cloud-native services for (distributed) computing like batch processing or serverless functions (FaaS), this programming model no longer applies, as PaaS and FaaS offerings are almost exclusively exposed via REST APIs. Users can interact with these services through SDKs provided by the cloud platform, which are thus platform-specific, even though the underlying services are typically not. Therefore, if users want to run distributed applications using PaaS and FaaS offerings, they manually need to prepare their application and implement glue code for the specific cloud SDK. Glue code serves solely to "adapt" different parts of code that would otherwise be incompatible. Glue code does not contribute any functionality towards meeting program requirements; instead, glue code often appears in code that lets existing libraries or programs interoperate, as in language bindings or foreign function interfaces. For example, to run code as a batch job on the Microsoft Azure cloud, users need to create a pool of batch workers (each with their correct dependencies installed), prepare their application, create a batch job with the correct input and output bindings and specify how the remote workers execute the code. A simple hello-world-style example for Azure Batch would require almost 400 lines of Python code. Similar steps apply to running code serverless via Azure or AWS Lambda functions. As the required glue code is both heavily application and platform dependent, it oftentimes needs to be re-written multiple times.

Existing solutions for distributed computing in the cloud fall into three main categories: (1) Cluster-based cloud computing, (2) Function and Platform as-a-service(s), and (3) Academic solutions.

In examples, cluster-based cloud computing includes classic cluster managers (e.g. Azure CycleCloud, AWS ParallelCluster) or cluster managers for container orchestrations (e.g., Kubernetes, Docker Swarm). In either case, users are responsible for managing the life cycle of a cluster, which includes the creation of a set of instances, the establishment of a virtual network and connections between nodes/containers and the mounting of parallel file systems. Users are also (in their application) responsible for distributing and scheduling the parallel tasks within their program (e.g., as a parallel loop). This creates a large amount of management overhead for the user. Another disadvantage of the classic cluster approach for HPC in the cloud is the master-worker scheme on which cluster-based computing is based. This exposes the master-worker as a single point of failure and makes long-running applications prone to resilience problems.

In examples, function and platform-as-a-service(s) includes serverless solutions (e.g., AWS Lambda, Azure Functions, Google Cloud Functions), managed compute and orchestration services (e.g., AWS Step Functions, Azure Durable Functions, AWS/Azure Batch, Azure Logic Apps) and cloud-native storage solutions (e.g., AWS S3, Azure Blob Storage, Dynamo DB, Cosmos DB). These services provide many advantages for running HPC workloads in the cloud, such as automated and semi-automated resource allocation, high scalability, and lower cost due to improved resource utilization. However, integrating these services into existing HPC applications requires major changes to the software, as cloud services are exposed via platform/vendor-specific APIs or require a specific representation of an application (e.g., a state machine expressed in JSON format). However, the software in HPC is based on two-side (MPI) or one-sided communication statements (i.e., tasks/futures/broadcast/reduce) that fundamentally differ from REST APIs of cloud services. Currently, there exists no commercial or academic solution that bridges this gap.

Existing academic solutions tend to be directed to adapting serverless (FaaS) computing for general-purpose computations. Several frameworks enable users to execute workloads through serverless environments such as AWS Lambda, including PyWren, gg, mu, and Kappa. PyWren, gg, and mu are three academic serverless frameworks that enable running applications via a swarm of serverless functions. However, these projects are solely focused on FaaS and do not allow executions through additional services (e.g., batch processing via AWS/Azure Batch). These frameworks require that user applications be manually partitioned into components that fit into the serverless function framework, i.e., they can be executed within given time and memory limits. Additionally, none of these existing frameworks provide a concurrency API that closely resembles existing APIs for cluster-based distributed programming.

The Kappa framework is a serverless orchestration framework that does provide a concurrency API based on task-based distributed programming. However, Kappa executes workloads only through serverless functions and does not provide users access to other PaaS offerings. This severely limits the possibility of applying Kappa to real-world HPC applications due to serverless computing's hardware restrictions (limited memory/execution time). Kappa addresses the limited execution time through automatic checkpointing, but this is not a feasible solution to long-running HPC applications like seismic imaging, which often requires that several gigabytes or terabytes of data be frequently moved to and from storage. Technically, Kappa is implemented through checkpointing and captures the current state of a program using continuations.

Thus, unlike existing cluster-based cloud computing techniques, examples provided herein allow users to take advantage of FaaS/PaaS offerings that shift responsibilities, such as being responsible for distributing and scheduling parallel tasks within programs (e.g., as a parallel loop), from the user to the cloud platform. Further, unlike Kappa, examples provided herein provide more flexibility to interface a broader range of services (e.g., for batch computing) and allow for creating IO bindings or resource files required for specific cloud services.

Examples of the present disclosure are directed to utilizing distributed computing with cloud-native PaaS and FaaS offerings based on an additional layer of abstraction that sits on top of existing RESTful cloud SDKs. An API can be utilized that, at the user side, resembles existing APIs for distributed computing based on one-sided communication and remote function calls. On the back end, the remote function calls (RFCs) are translated to API calls for the various cloud services. For users, the additional abstraction level makes it easier to adapt cloud-native services for distributed computing and does not require any platform-specific glue code based on multiple cloud SDKs. These abstractions will therefore increase the productivity of users and open up PaaS and FaaS offerings to researchers and developers who want to focus on their application rather than on cloud architectures and how to deploy their code. Additionally, by being able to easily access services that otherwise require large amounts of glue code, users can leverage services that allow them to significantly reduce cost, increase resilience and scalability in comparison to cluster-based approaches.

Examples of the present disclosure implement a software design based on a mullet architecture, i.e., an API that on the user side provides one-sided communication statements and RFCs, while the backend is implemented through RESTful cloud SDKs. Users are therefore able to write code that resembles conventional distributed applications, but remote function calls are executed via services such as batch computing or cloud functions. As these services do not provide direct networking connectivity between the user/ master and workers/functions, leveraging traditional RPC APIs is not possible. As cloud services are almost always exposed via REST APIs based on HTTP endpoints, an abstraction layer is implemented that translates remote function calls and high-level code statements at the user side to REST API calls via existing cloud SDKs.

In accordance with examples of the present disclosure, the translation of a remote function call to a cloud API call (including the creation of correct input-output bindings) is to be fully automatic. Therefore there is a need to translate a conventional function definition and function call to code that can be executed through a cloud SDK. For example, if a user defines a function with a return statement and then executes this function remotely, the expression can be analyzed, and the return statement can be replaced with a serialization step that writes the result to the local (remote) disk. A resource binding that automatically uploads the file to cloud object storage is implemented, making the data available to the user through another function call, without requiring the user to directly interact with the storage client. The automatic code generation includes several steps, such as the capturing of input-output arguments, the creation of IO bindings, and the splitting of expressions into individual function calls or batch tasks. The generated code, along with the IO bindings, is then executed via cloud services using the respective SDK.

In examples, the proposed framework can be implemented in the Julia language, a programming language that was designed from the ground up for numerical scientific and distributed computing. Similar to Python, Julia allows programming in a high-level fashion, enabling quick prototyping and development. However, unlike Python, Julia naturally supports metaprogramming, that is, expressions are represented through Julia data structures and can be analyzed and manipulated in the language itself. Additionally, and unlike Python, Julia offers optional typing and is based on just-in-time (JIT) compilation using LLVM for example, making the language nearly as fast as C code. Julia also interacts well to other programming languages, as it allows for a direct interface with Python, Fortran or C without any glue code.

Julia also provides a built-in package for distributed computing, which is part of the language itself. Accordingly, one-sided remote function calls to cloud-based services can be enabled through extensions of Julia's distributed capabilities and provide a set of high-level instructions for executing functions, such as but not limited to AWS/Azure Batch jobs, Azure/Lambda/Google Cloud Functions, and Azure Durable Functions calls. Such functions enable users to define serverless workflows and execute batch computations via simple Julia macro statements. The Julia language provides such macros to map computations to a pool of interconnected Julia workers and, in examples described herein, are extended to other cloud-based services, such as those services offered in an AWS, GCP or Azure environment. User-side remote function calls are translated to SDK calls to the respective cloud service by analyzing Julia code (i.e., expressions) and creating the required IO bindings to execute the code remotely. Although examples provided herein are generally directed to the Julia programming language, other programming languages are contemplated.

FIG. 1 depicts details of an operating environment 100 for implementing a code generation tool for a cloud-native high-performance computing environment 124 in accordance with examples of the present disclosure. In examples, the operating environment 100 includes a computing device 104 at which a user may generate or otherwise create application instructions 110 defining a workload to be completed by the cloud-native high-performance computing environment 124. The computing device 104, although depicted as a desktop computer, for example, may be any one of a portable or non-portable computing device. Examples of the computing device 104 include, but are not limited to, a virtual machine, a laptop, a desktop, or a server. The cloud-native high-performance computing environment 124 describes an environment for large-scale workloads that require a large number of cores, often numbering in the hundreds or thousands. Scenarios where the cloud-native high-performance computing environment 124 may be utilized include but are not limited to image rendering, fluid dynamics, financial risk modeling, oil exploration, drug design, and engineering stress analysis. In examples, the work to be processed can be split into discrete tasks, which can be run across many cores simultaneously. In general, each task is finite, where the task takes an input, does some processing, and produces an output. For some applications, tasks are independent and can run in parallel. In other cases, tasks are tightly coupled, meaning they must interact or exchange intermediate results.

A development environment 106 may be executed by the computing device 104; the development environment generally includes a combination of a text editor and a runtime implementation. The text editor allows the user 102 to write code, or application instructions 110, for a specific application or workload. In examples, the development environment 106 includes a user application programming interface (API) and code generator 116. The user API & code generator 116 translates a remote function call to a cloud API call specific to the cloud-native high-performance computing environment 124. For example, the application instructions 110 may include one or more expressions 112A-112C. The one or more expressions 112A-112C may be associated with a previously generated program or workload deployed to on-premise HPC clusters.

To configure the application instructions 110 for use with the cloud-native high-performance computing environment 124, for example, one or more tags (e.g., @macro_) may be used to identify one or more expressions 112A-112C that are to be translated for use with a software development kit (SDK) to access REST and RESTFul endpoints 125 associated with the cloud-native high-performance computing environment 124. In some examples, a user 102 manually adds a tag to those expressions 112A-112C needing translation. In other examples, the tag may be automatically added to expressions 112A-112C needing translation. For example, a tag may be automatically associated with one or more expressions 112A-112C that match an expression or keyword for translation. Accordingly, based on the tag identifying an expression for translation, a conventional function definition and function call associated with the expression (e.g., 114A-114C) is translated to code that can be executed through a cloud SDK to access REST and RESTFul endpoints 125 associated with the cloud-native high-performance computing environment 124. For example, if a user-defined expression includes a function with a return statement and such function is to be executed at a cloud-native high-performance computing environment 124, the expression is analyzed, and the return statement is replaced with a serialization step that writes the result to a file at a local or remote storage area. A resource binding is then automatically created, where the resource binding uploads the file to a storage area (such as cloud object storage) that is available to the user using another function call, but without requiring the user to directly interact with a storage client.

The automatic translation includes several steps such as capturing of input-output arguments, the creation of IO bindings is so required by the cloud service, and the splitting of expressions into individual function calls or batch tasks. As an example, abstract syntax trees are collected for each expression that is to be executed at the cloud-native high-performance computing environment 124. An abstract syntax tree is a tree representation of the abstract syntactic structure of source code written in a programming language. Each node of the tree denotes a construct occurring in the source code. Each of the collected abstract syntax trees is analyzed to capture runtime arguments and to replace symbols of variables with actual variables. Each of the abstract syntax trees is then serialized and provided to the cloud-native high-performance computing environment 124 as a resource file via the network 140. For expressions with return statements, the return statements are replaced with an output file name (e.g., randomly named output file). The output file name is then added as an output resource and provided to the cloud-native high-performance computing environment 124 via the network 140.

An example abstract syntax tree for an algorithm (while $b \neq 0$, a:=a−b, return a) is provided as abstract syntax tree 160. The abstract syntax tree 160 may include a statement sequence 162 and return a value 166 (e.g., a) indicated by a return statement 164. A while branch 168 indicates that the while loop would continue to execute in accordance with a compare statement 170 (e.g., $\neq$) comparing a variable 174 (e.g., b) to a constant 176 (e.g., 0). An assignment at 172 would assign the output of the operation (e.g., "−") between the variable 182 (e.g., a) and variable 184 (e.g., b) to the variable 178 (e.g., a). In examples, the symbols representing the variables (e.g., a and b) would be replaced with actual variables. The return statement (e.g., 164) would be replaced with a serialization of the return argument (e.g., a) and a write operation of the serialized file to local disk storage or cloud object storage using a randomly generated file name. Accordingly, the processed abstract syntax tree can then be serialized and provided as one or more resource files 118. The one or more resource files 118 may include the translated function call and/or the output file name.

As depicted in FIG. 1, resources 120, including input file(s) and application(s) to process the input file(s), may be uploaded to the cloud-native high-performance computing environment 124. The input files can be any data that the application instructions process, such as financial modeling data, video files to be transcoded, etc. The application files can include scripts or applications, such as the one or more resource files 118 that process the data. The resources 120 may be uploaded to a storage area 138. A pool 134 of compute nodes 136A-136B may be created and associated with a cloud services account 126. The cloud services account 126 is associated with the cloud-native high-performance computing environment 124 and determines what computing resources are available and in what type of configuration such resources exist. A compute node 136 may be a virtual machine that processes a portion of an application's workload. For example, a compute node 136 may process or otherwise execute one or more tasks associated with a job 130. Job 130 may be defined to run the workload on pool 134, where pool 134 is a collection of nodes that the application is to run on. A job 130 is a collection of tasks 132A-132C. Job 130 manages how computation is performed by its tasks 132A-132C on the compute nodes 136A-136C in pool 134. A job 130 specifies the pool 134 in which the work is to be run. A new pool 134 can be created for each job 130, or one pool 134 may be used for many jobs 130. A task, such as task 132A, is a computation unit associated with a job, such as job 130. Each task 132A-132C runs on a respective node 136A-136C. Tasks 132 are assigned to nodes 136 for execution or are queued until a node 136 becomes free. Task 132 runs one or more programs or scripts on a compute node 136 to perform the work that is to be done. The tasks 132A-132C may be defined per the resources 120 and associated with job 130.

Figure 2:
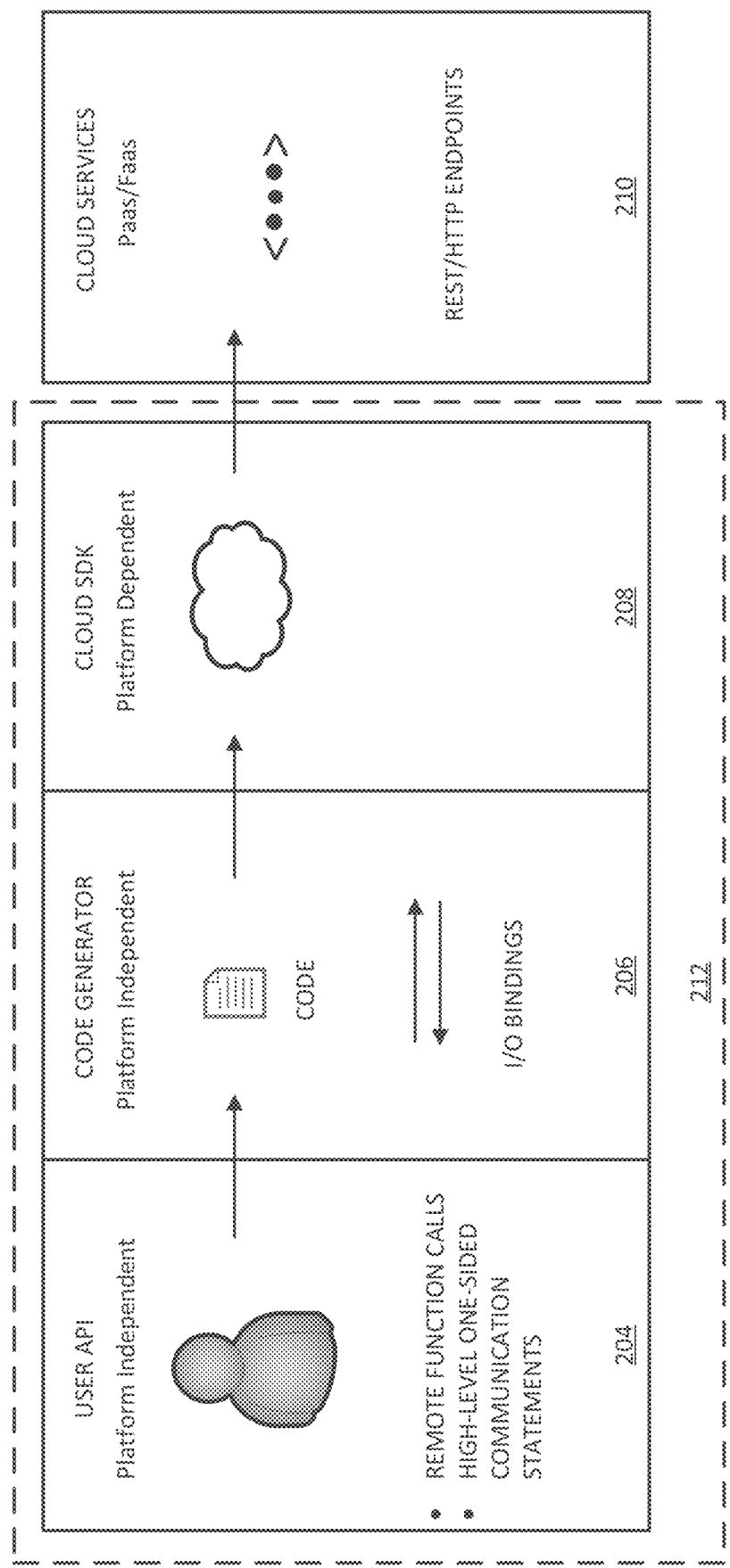
FIG. 2 depicts details directed to a code generation tool in accordance with examples of the present disclosure.

FIG. 2 depicts a framework for distributed computing based on cloud PaaS and FaaS components in accordance with examples of the present disclosure. More specifically, the code generator 206 bridges a platform independent user API 204 and a cloud SDK to provide existing workloads and applications originally designed for use with HPC clusters access to cloud services 210. The user API 204 can be platform-independent and provides remote function calls and high-level one-sided communication statements. The code generator 206 can be platform-independent and translates remote function calls, and high-level code statements at the user side (e.g., the user API 204) to REST API calls via existing and platform-dependent cloud SDKs 208. The user API 204, code generator 206, and the cloud SDK 208 may be implemented in a user computing device, such as the computing device 104 (FIG. 1) and/or a virtual machine. The cloud services 210 may be accessible via the REST and RESTFul endpoints 125 (FIG. 1).

FIG. 3 depicts a first example of a macro implemented at the user API 304 in accordance with examples of the present disclosure. The macro @bcast can be added to an existing expression to make the existing expression available as a resource at a cloud-native high-performance computing environment. The code generator 306, which may provide the same as or similar functions as the user API & code generator 116 (FIG. 1), may translate the expression from the user API 304 to create an object storage container, upload the expression to cloud object storage, and create a batch resource file from the object using a cloud API call 308 exposed via a cloud SDK. More specifically, the code generator 306 may expand the expression into a macro that serializes the expression, generates the required resource bindings, and returns a future, or reference to object storage, such as a blob, to the user. Accordingly, implementing the @bcast expr macro via the user API 304 allows the existing expression expr to be implemented at a cloud-native high-performance computing environment.

FIG. 4 depicts a second example of a macro implemented at the user API 404 in accordance with examples of the present disclosure. The macro @batchdef can be added to an existing expression to ready the expression for execution on the local machine and/or on subsequent batch workers and/or serverless functions. The code generator 406, which may provide the same as or similar functions as the user API & code generator 116 (FIG. 1), appends the expression (its abstract syntax tree) to a global state variable. Upon a call to @batchexec, the code generator 406 may serialize the expression, and then upload the serialized expression to the cloud storage, such as Azure blob storage. Accordingly, the user API 404 and the code generator 406 do not make a call to the cloud API 408 until a call to @batchexec is made.

Figure 5:
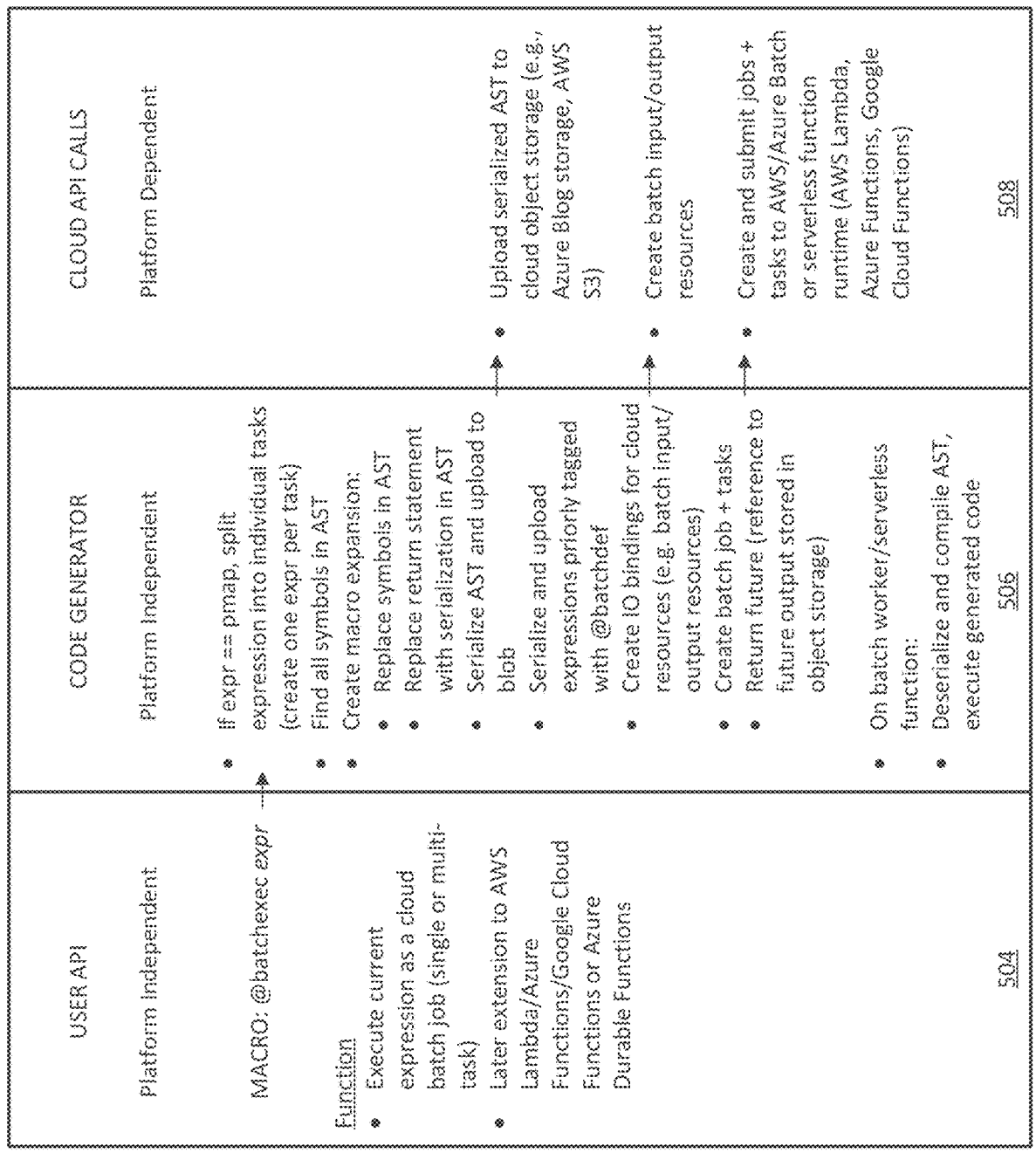
FIG. 5 depicts details of a third macro expansion in accordance with examples of the present disclosure.

FIG. 5 depicts a third example of a macro implemented at the user API 504 in accordance with examples of the present disclosure. The macro @batchexec can be added to an existing expression to execute the existing expression as a single or multitask batch job in the cloud. In examples, the code generator 506, which may provide the same as or similar functions as the user API & code generator 116 (FIG. 1) translates the expression from the user API 504 to upload serialized abstract syntax trees to the storage, create batch input/output resources or other resources required by the respective cloud service, and to create and submit jobs and tasks to the cloud-native high-performance computing environment using a cloud API call 508 exposed via a cloud SDK. More specifically, the code generator 506 expands the expression expr by collecting and analyzing all symbols in an abstract syntax tree. In examples, those expressions, including a parallel mapping (pmap), may be split into individual tasks such that a single expression is created for each task to be performed in parallel. The code generator 506 replaces the symbol variables in the abstract syntax tree with actual variables, replaces return statements in the abstract syntax tree with serialization, serializes the abstract syntax tree, and uploads the serialized syntax tree to the storage, such as Azure blob storage. In addition, the code generator 506 creates input/output bindings, including but not limited to input resource files and output resource files as previously described. In examples, the @batchexec expr creates jobs, such as batch jobs and tasks and may return a reference to future output stored in object storage. When executed at the cloud-native high-performance computing environment, a worker or serverless function may de-serialize and compile the abstract syntax tree into an executable which is then executed on the local hardware. The cloud API call 508 provides an interface to upload the serialized abstract syntax tree to storage, create input/output resources (depending on the cloud service that is being called), and then create and submit jobs/tasks for execution. Accordingly, implementing the @batchexec expr macro via the user API 504 allows the existing expression expr to be implemented at a cloud-native high-performance computing environment.

The user APIs 304 (FIG. 3), 404 (FIG. 4), and 504 (FIG. 5) are the same user API providing multiple macro expansion functions. Similarly, the code generator 306 (FIG. 3), 406 (FIG. 4), and 506 (FIG. 5) are the same code generator translating expression from the user API to cloud API calls and/or cloud SDKs. The cloud API call 308 (FIG. 3), 408 (FIG. 4), and 508 (FIG. 5) are the same cloud API/SDK and are dependent upon the cloud-native high-performance computing environment.

Figure 6:
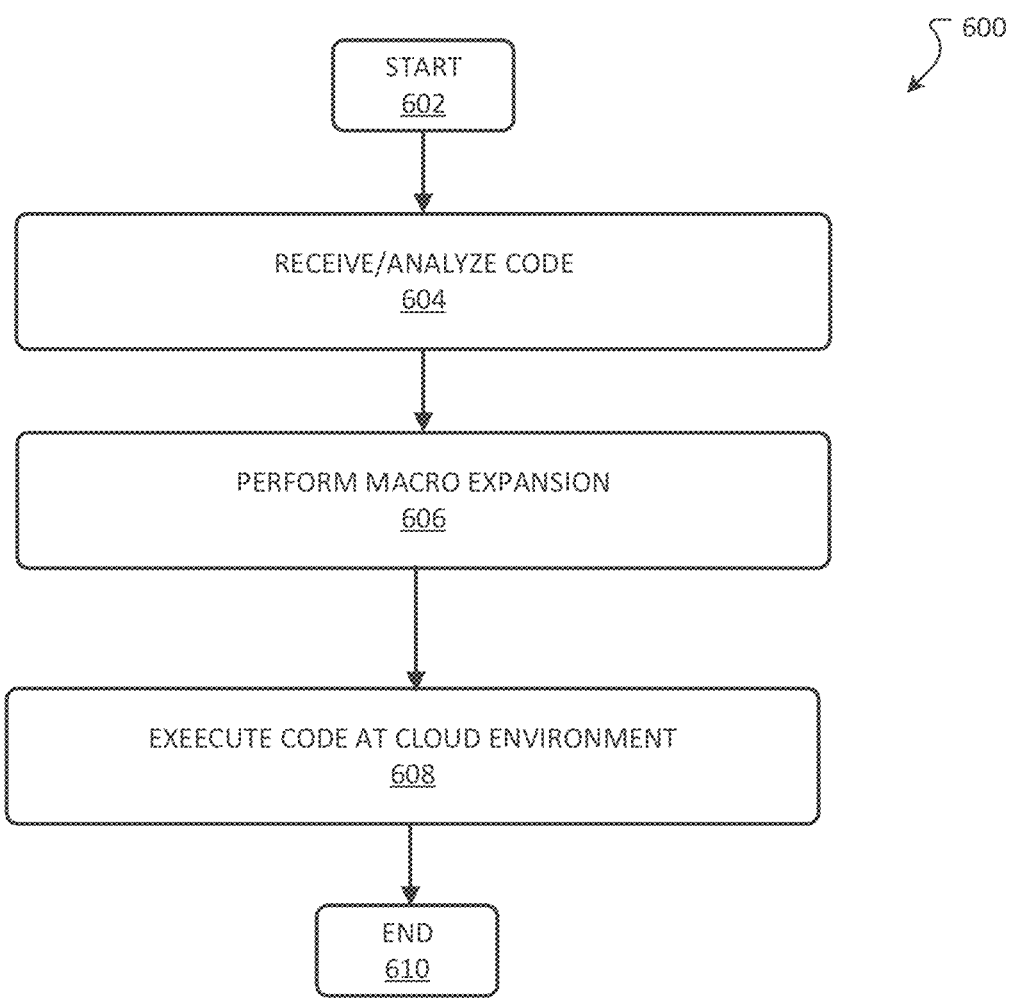
FIG. 6 depicts details of a method for generating a code for use at a cloud-native high-performance computing environment in accordance with examples of the present disclosure.

FIG. 6 depicts details of a method 600 for receiving, generating, and then executing code at a cloud-native high-performance computing environment in accordance with examples of the present disclosure. A general order for the steps of method 600 is shown in FIG. 6. Generally, method 600 starts at 602 and ends at 610. Method 600 may include more or fewer steps or may arrange the order of the steps differently than those shown in FIG. 6. Method 600 can be executed as a set of computer-executable instructions executed by a computer system and encoded or stored on a computer-readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc., described in conjunction with FIGS. 1-5.

The method starts at 602, where flow may proceed to 604. At 604, tagged code, including tagged application expressions such as but not limited to the application instructions 110 (FIG. 1), including tagged expressions 114A-114C (FIG. 1), may be received and/or analyzed. For example, a development environment 106 (FIG. 1) may be executed by the computing device 104 (FIG. 1) and includes code, or application instructions 110 (FIG. 1), for a specific application or workload. In examples, the development environment 106 includes a user application programming interface (API) and code generator 116. The expressions included in the code may be analyzed, and those expressions, including a matching macro tag, may be identified. At 606, each of the expressions having a macro tag may be expanded. In examples, the expansion of the macros may be performed by a code generator 306/406/506 and/or the user API & code generator 116. The user API & code generator 116 translates a remote function call to one or multiple cloud API calls specific to the cloud-native high-performance computing environment 124.

Additionally, the macro expansion 606 may include configuring one or more parameters to manage the requirements for performing the computing operations. For example, this may include creating the batch job, creating a container in cloud object storage, and creating specialized input and output bindings that may be required by the respective cloud service (e.g. the batch service). Method 600 may proceed to 608, where the batch job is executed at the cloud-native high-performance computing environment. Method 600 may return data or provide access to the data via one or more output resources in the form of remote references. Method 600 may end at 610.

Figure 7:
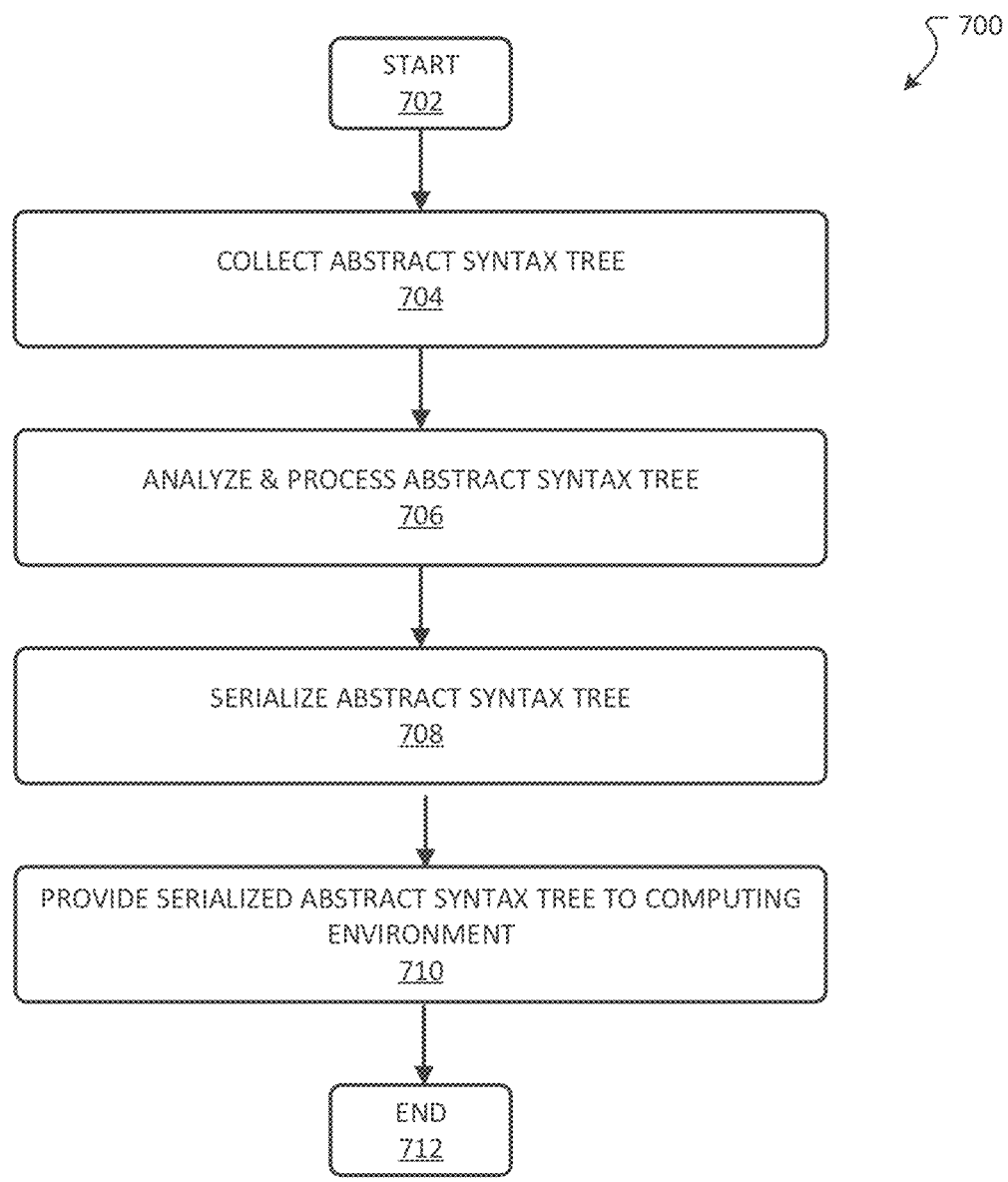
FIG. 7 depicts details of a method for generating a serialized abstract syntax table for use at a cloud-native high-performance computing environment in accordance with examples of the present disclosure.

FIG. 7 depicts a method 700 for translating remote function calls to API calls available via a cloud SDK in accordance with examples of the present disclosure. A general order for the steps of method 700 is shown in FIG. 7. Generally, method 700 starts at 702 and ends at 712. Method 700 may include more or fewer steps or may arrange the order of the steps differently than those shown in FIG. 7. Method 700 can be executed as a set of computer-executable instructions executed by a computer system and encoded or stored on a computer-readable medium. In examples, aspects of method 700 are performed by one or more processing devices, such as a computer or server. Further, method 700 can be performed by gates or circuits associated with a processor, Application Specific Integrated Circuit (ASIC), a field-programmable gate array (FPGA), a system on chip (SOC), a neural processing unit, or other hardware devices. Hereinafter, method 700 shall be explained with reference to the systems, components, modules, software, data structures, user interfaces, etc., described in conjunction with FIGS. 1-6.

The method starts at 702, where flow may proceed to 704. At 704, abstract syntax trees are collected for each expression to be executed in the cloud-native high-performance computing environment. Expression may represent function definitions/calls, variable assignments, load statements of modules and others. Each of the collected abstract syntax trees is analyzed to capture runtime arguments (in case of function calls), and symbols of variables are replaced with actual variables at 706. Each of the abstract syntax trees is then serialized at 708 and provided to the cloud-native high-performance computing environment as a resource file at 719. For expressions with return statements (i.e., function calls), the return statements are replaced in 706 with a serialization of the return argument and a write statement of the serialized expression to the local storage of the remote cloud worker using a randomly generated file/object name. Depending on the cloud service that is used to execute the computations, it may be required to create an output binding for the generated object, so that the locally stored object is moved to a durable cloud storage service upon the completion of the computations in 710, from where it is accessible to the user at a later point in time. Method 700 ends at 712.

Figure 8:
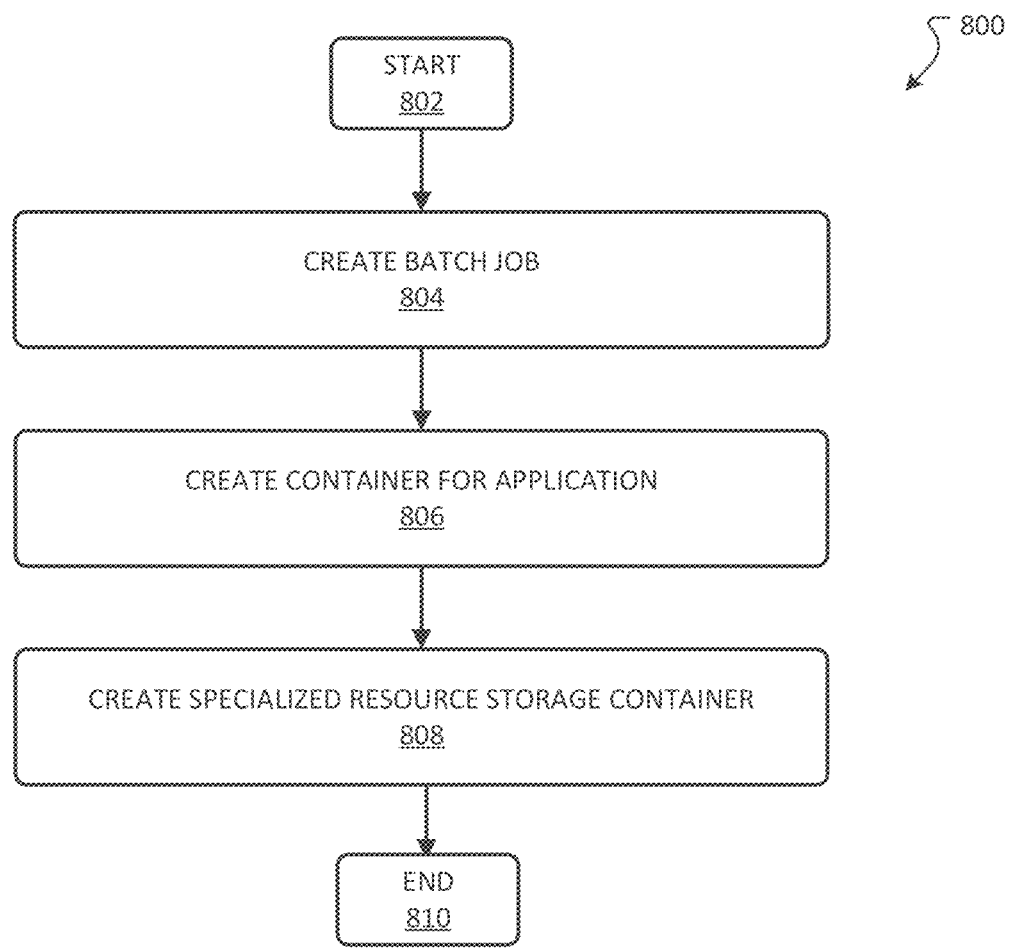
FIG. 8 depicts details of a method for generating an environment for use at a cloud-native high-performance computing environment in accordance with examples of the present disclosure.

FIG. 8 depicts details of a method 800 for creating/configuring one or more parameters to manage the requirements for performing computing operations in accordance with examples of the present disclosure. A general order for the steps of method 800 is shown in FIG. 8. Generally, method 800 starts at 802 and ends at 810. Method 800 may include more or fewer steps or may arrange the order of the steps differently than those shown in FIG. 8. The method 800 can be executed as a set of computer-executable instructions executed by a computer system and encoded or stored on a computer-readable medium. In examples, aspects of method 800 are performed by one or more processing devices, such as a computer or server.

Further, method 700 can be performed by gates or circuits associated with a processor, Application Specific Integrated Circuit (ASIC), a field-programmable gate array (FPGA), a system on chip (SOC), a neural processing unit, or other hardware devices. Hereinafter, the method 800 shall be explained with reference to the systems, components, modules, software, data structures, user interfaces, etc., described in conjunction with FIGS. 1-7.

The method starts at 802, where flow may proceed to 804. At 804, a cloud computing service is initiated which may include (but may not be limited to) cloud batch jobs or serverless function executions. In case of cloud batch jobs, the initiated job is a collection of tasks, where the cloud service manages how the set of parallel tasks are executed in a pool of compute nodes. The method may proceed to 806, where a container for an application is created. Using containers provides a way to run tasks without having to manage an environment and dependencies to run applications. Containers deploy applications as lightweight, portable, self-sufficient units that can run in several different environments. Container-based tasks can also take advantage of features of non-container tasks, including application packages and management of resource files and output files. The method may proceed to 808, where specialized resource storage containers are created. Resource files put data onto a virtual machine in the cloud-native high-performance computing environment, but the type of data and how it is used is flexible. In examples, there are a few options to generate resource files that may depend on where data is to be stored. Such options may include a storage container URL, a storage container name, and a web endpoint. The storage container URL generates a resource file from any storage container. The storage container name generates a resource file from the name of a container in a linked storage account. The web endpoint generates a resource file from any valid HTTP URL.

The creation process for resource files varies depending on where the original data is stored. The specialized resource containers may include but are not limited to an input resource file and an output resource file. Method 800 may end at 810.

Figure 9:
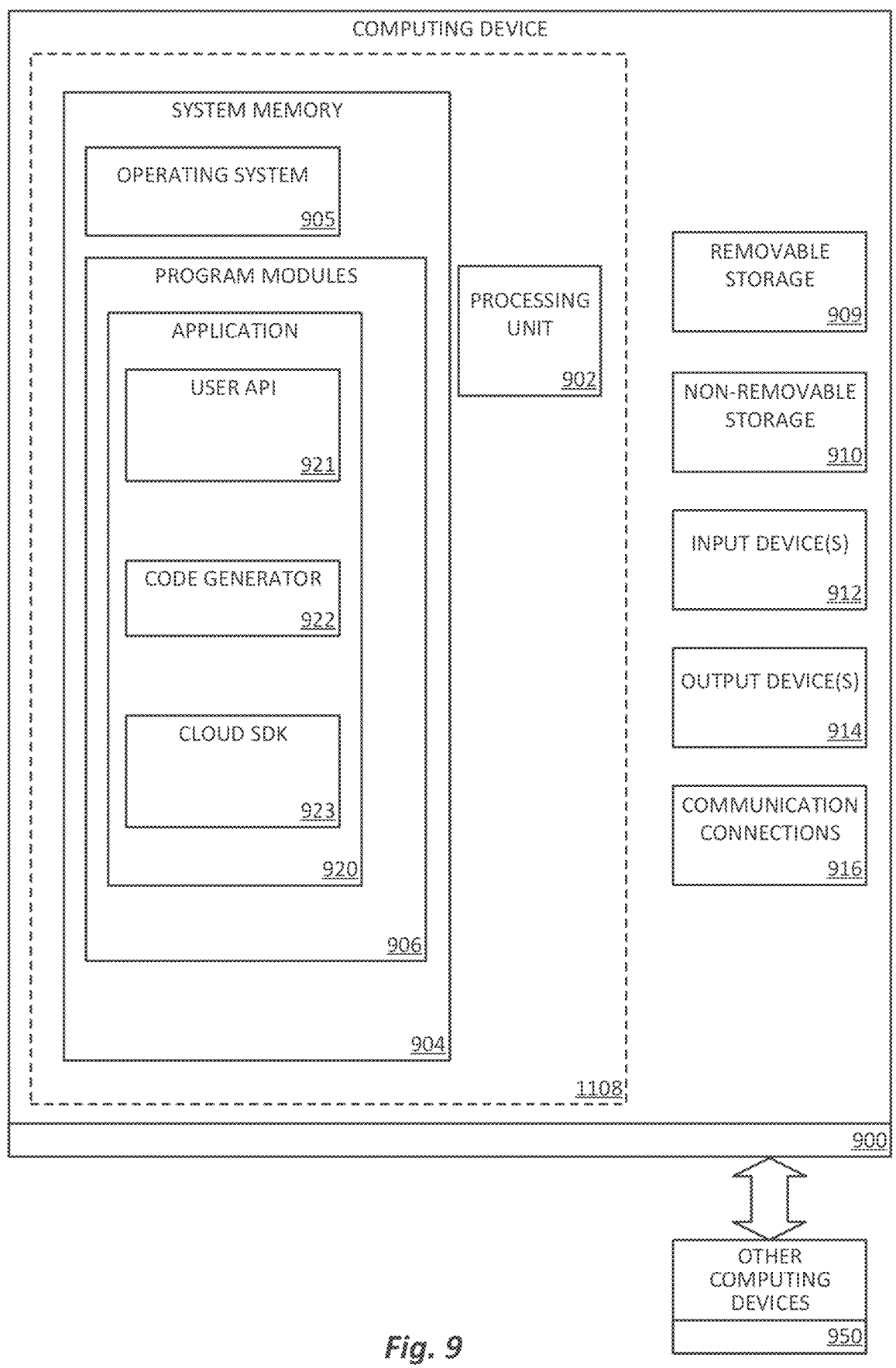
FIG. 9 depicts a block diagram illustrating physical components of a computing system with which aspects of the disclosure may be practiced.
Figure 10A:
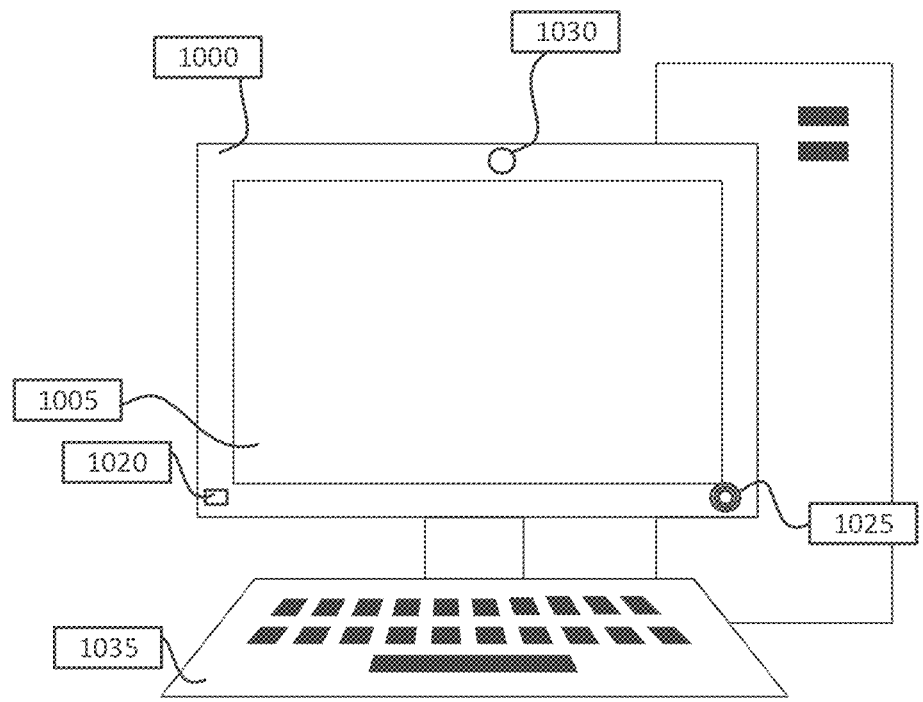
FIGS. 10A-10B depict details of one or more computing systems in accordance with examples of the present disclosure.
Figure 10B:
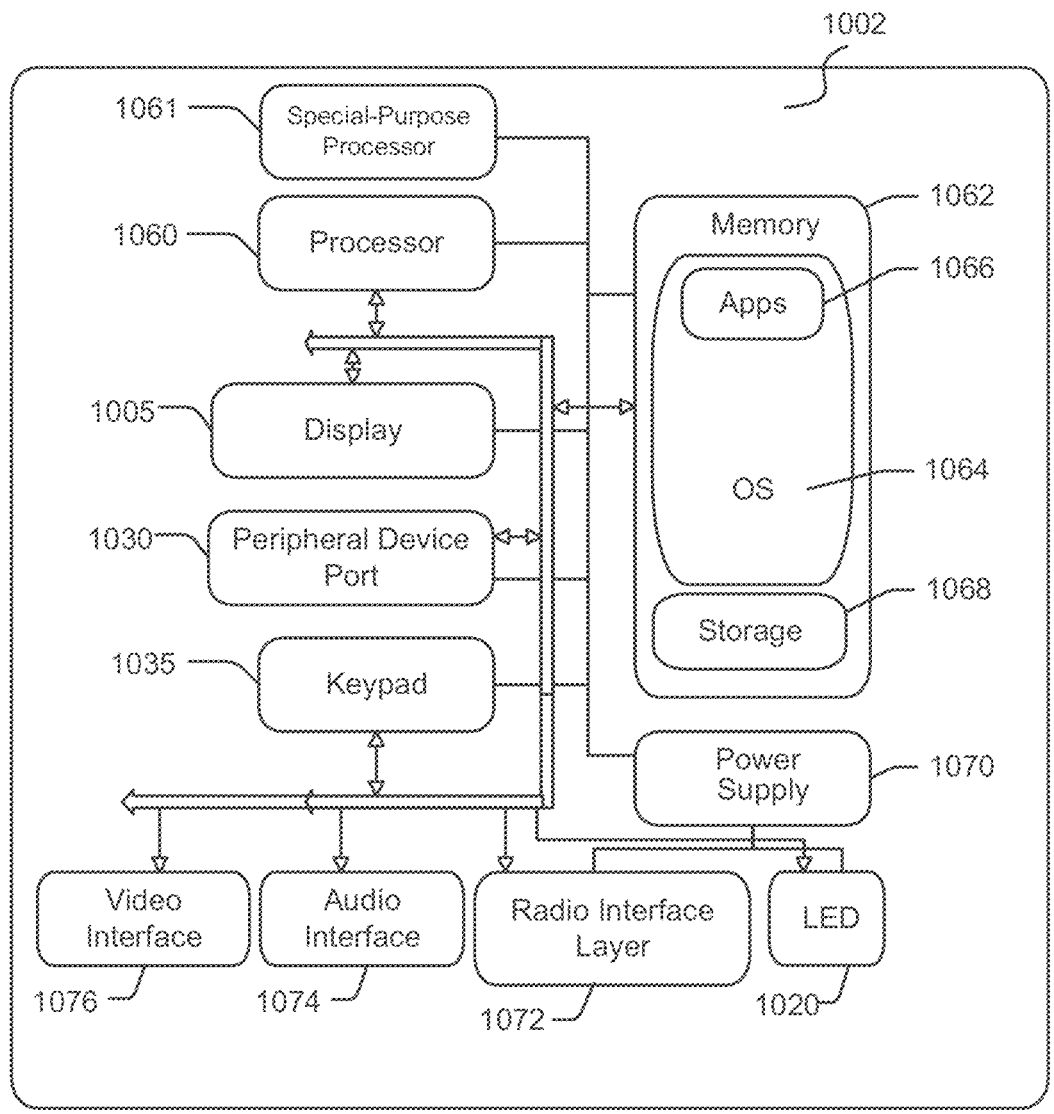
Figure 11:
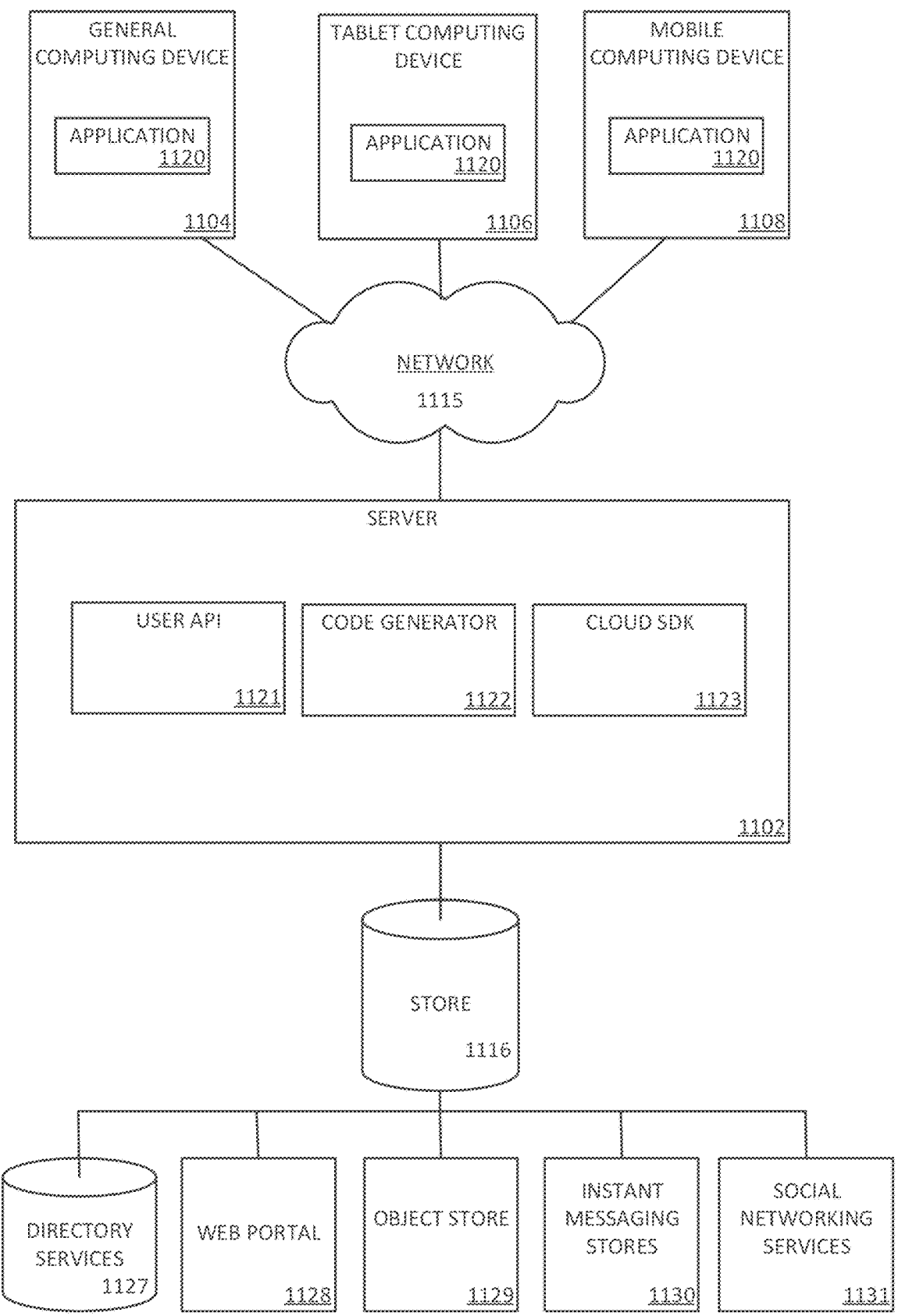
FIG. 11 depicts an architecture of a system for processing data received at a computing system in accordance with examples of the present disclosure.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing system configurations that may be utilized for practicing aspects of the disclosure described herein.

FIG. 9 is a block diagram illustrating physical components (e.g., hardware) of a computing system 900 with which aspects of the disclosure may be practiced. The computing system components described below may be suitable for the computing and/or processing devices described above. In a basic configuration, the computing system 900 may include at least one processing unit 902 and a system memory 904. Depending on the configuration and type of computing system, the system memory 904 may comprise, but is not limited to, volatile storage (e.g., random-access memory (RAM)), nonvolatile storage (e.g., read-only memory (ROM)), flash memory, or any combination of such memories.

The system memory 904 may include an operating system 905 and one or more program modules 906 suitable for running software application 920, such as one or more components supported by the systems described herein. As examples, system memory 904 may include the user API 921, the code generator 922, and the cloud SDK 923. The user API 921 may be the same as or similar to the user API 204 (FIG. 2), 304 (FIG. 3), 404 (FIG. 4), and 504 (FIG. 5). The code generator 922 may be the same as or similar to the code generator 2066 (FIG. 2), 306 (FIG. 3), 406 (FIG. 4), and 506 (FIG. 5). The cloud SDK may be the same as or similar to the cloud SDK 208 (FIG. 2), 308 (FIG. 3), 408 (FIG. 4), and 508 (FIG. 5). In examples, the user API & code generator 116 (FIG. 1) may include the user API 921 and the code generator 922. The operating system 905, for example, may be suitable for controlling the operation of the computing system 900.

Furthermore, embodiments of the disclosure may be practiced in conjunction with a graphics library, other operating systems, or any other application program and are not limited to any particular application or system. This basic configuration is illustrated in FIG. 9 by those components within a dashed line 908. The computing system 900 may have additional features or functionality. For example, the computing system 900 may also include additional data storage devices (removable and/or non-removable) such as magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., software applications 920) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 900 may also have one or more input device(s) 912 such as a keyboard, a mouse, a pen, a sound or voice input device, a touch or swipe input device, etc. The output device(s) 914, such as a display, speakers, a printer, etc., may also be included. The aforementioned devices are examples, and others may be used. The computing system 900 may include one or more communication connections 916, allowing communications with other computing systems 950. Examples of suitable communication connections 916 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 900. Any such computer storage media may be part of the computing system 900. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A-10B illustrate a computing system 1000, for example, a mobile telephone, a smart phone, wearable computer (such as a smart watch), a tablet computer, a desktop computer, a laptop computer, and the like, with which embodiments of the disclosure may be practiced. With reference to FIG. 10A, one aspect of a computing system 1000 for implementing the aspects is illustrated. In a basic configuration, the computing system 1000 is a desktop computer having both input elements and output elements. The computing system 1000 typically includes a display 1005, which may also function as an input device (e.g., a touch screen display). The computing system 1000 may also include a keypad 1035. The keypad 1035 may be a physical keypad or a "soft" keypad generated on the touch screen display.

In various embodiments, the output elements include the display 1005 for showing a graphical user interface (GUI), a visual indicator 1020 (e.g., a light-emitting diode), and/or an audio transducer 1025 (e.g., a speaker). In yet another aspect, the computing system 1000 incorporates input and/or output ports, such as an audio input (e.g., a microphone jack), an audio output (e.g., a headphone jack), and a video output (e.g., an HDMI port) for sending signals to or receiving signals from an external device.

FIG. 10B is a block diagram illustrating the architecture of one aspect of a mobile computing system. That is, the computing system 1000 can incorporate a system (e.g., an architecture) 1002 to implement some aspects. In one embodiment, system 1002 is implemented as a "computing system" capable of running one or more applications (e.g., browser, e-mail, calendaring, contact managers, messaging clients, games, and media clients/players). In some aspects, system 1002 is integrated as a computing system, such as a desktop computer.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, maps programs, and so forth. System 1002 also includes a nonvolatile storage area 1068 within the memory 1062. The nonvolatile storage area 1068 may be used to store persistent information that should not be lost if the system 1002 is powered down. The application programs 1066 may use and store information in the nonvolatile storage area 1068, such as e-mail or other messages used by an e-mail application, and the like. A synchronization application (not shown) also resides on system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the computing system 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world" via a communications carrier or service provider. Transmissions to and from the radio interface layer 1072 are conducted under the control of the operating system 1064. In other words, communications received by the radio interface layer 1072 may be disseminated to the application programs 1066 via the operating system 1064, and vice versa.

The system 1002 may further include a video interface 1076 that enables an operation of an on-board camera 1030 to record still images, video stream, and the like. A computing system 1000 implementing the system 1002 may have additional features or functionality. For example, the computing system 1000 may also include additional data storage devices (removable and/or non-removable) such as magnetic disks, optical disks, or tape. Such additional storage is illustrated in FIG. 10B by the nonvolatile storage area 1068.

Data/information generated or captured by the computing system 1000 and stored via the system 1002 may be stored locally on the computing system 1000, as described above, or the data may be stored on any number of storage media that may be accessed by the device via the radio interface layer 1072 or via a wired connection between the computing system 1000 and a separate computing system associated with the computing system 1000, for example, a server computer in a distributed computing network, such as the Internet. As should be appreciated, such data/information may be accessed via the computing system 1000 via the radio interface layer 1072 or via a distributed computing network. Similarly, such data/information may be readily transferred between computing systems for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, a tablet computing device 1106, or mobile computing device 1108, as described above. Content at a server device 1102 may be stored in different communication channels or other storage types. For example, various documents may be stored using a directory service 1127, a web portal 1128, a mailbox service 1129, an instant messaging store 1130, or social networking services 1131.

One or more of the previously described program modules 906 or software applications 920 may be employed by server device 1102 and/or the personal computer 1104, a tablet computing device 1106, or mobile computing device 1108, as described above. For example, the server device 1102 may include the user API 1121, the code generator 122, and the cloud SDK 1123. The user API 1121 may be the same as or similar to the user API 204 (FIG. 2), 304 (FIG. 3), 404 (FIG. 4), 504 (FIG. 5), and 921 (FIG. 9). The code generator 1122 may be the same as or similar to the code generator 2066 (FIG. 2), 306 (FIG. 3), 406 (FIG. 4), 506 (FIG. 5), and 922 (FIG. 9). The cloud SDK may be the same as or similar to the cloud SDK 208 (FIG. 2), 308 (FIG. 3), 408 (FIG. 4), 508 (FIG. 5), and 923 (FIG. 9). In examples, the user API & code generator 116 (FIG. 1) may include the user API 1121 and the code generator 1122.

The server device 1102 may provide data to and from a client computing device such as a personal computer 1104, a tablet computing device 1106, and/or a mobile computing device 1108 (e.g., a smart phone) through a network 1115. By way of example, the computer system described above may be embodied in a personal computer 1104, a tablet computing device 1106, and/or a mobile computing device 1108 (e.g., a smart phone). Any of these embodiments of the computing devices may obtain content from the store 1116, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

The present disclosure relates to systems and methods for translating a software expression from a user application programming interface (API) call to an API call of a software development kit (SDK) according to at least the examples provided in the sections below:

(A) In one aspect, some examples include a method for translating a software expression from a user application programming interface (API) call to an API call of a software development kit (SDK). The method may include receiving a tagged expression indicating that a translation of the software expression from a user API call to an API call of an SDK is to be performed, the SDK being associated with a cloud-native high-performance computing environment; processing an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree; and providing the serialized abstract syntax tree and one or more resource files to the cloud-native high-performance computing environment for execution.

(A2) In some examples of A1, the method includes creating batch job to execute at least a portion of the serialized abstract syntax tree in the cloud-native high-performance computing environment; creating a storage container associated with the batch job; and creating a specialized resource container associated with the one or more resource files.

(A3) In some examples of A1-A2, the batch job is a multitask batch job.

(A4) In some examples of A1-A3, the method includes serializing output associated with the return statement to a filename; and adding the filename as an output resource in the one or more resource files.

(A5) In some examples of A1-A4, the method includes expanding the software expression by collecting and analyzing symbols in the abstract syntax tree; splitting the software expression into a plurality of individual tasks such that a single expression is created for each task; and performing the plurality of individual tasks in parallel.

(A6) In some examples of A1-A5, the method includes analyzing a plurality of software expressions; and automatically tagging at least one of the plurality of software expression resulting in the tagged expression.

(A7) In some examples of A1-A6, the method includes providing the serialized abstract syntax tree to the cloud-native high-performance computing environment a resource file.

In yet another aspect, some examples include a system including one or more processors and memory coupled to the one or more processors, the memory storing one or more instructions which when executed by the one or more processors, causes the one or more processors to perform any of the methods described herein (e.g., A1-A7 described above).

In yet another aspect, some examples include a computer-readable storage medium storing one or more programs for execution by one or more processors of a device, the one or more programs including instructions for performing any of the methods described herein (e.g., A1-A7 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method for translating a software expression from a user application programming interface (API) call to an API call of a software development kit (SDK), the method comprising:
    receiving a tagged expression indicating that a translation of the software expression from a user API call to an API call of an SDK is to be performed, the SDK being associated with a cloud-native high-performance computing environment;
    processing an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree; and
    providing the serialized abstract syntax tree and one or more resource files to the cloud-native high-performance computing environment for execution.

2. The method according to claim 1, further comprising:
    creating batch job to execute at least a portion of the serialized abstract syntax tree in the cloud-native high-performance computing environment;
    creating a storage container associated with the batch job; and
    creating a specialized resource container associated with the one or more resource files.

3. The method according to claim 2, wherein the batch job is a multitask batch job.

4. The method according to claim 1, further comprising:
    serializing output associated with the return statement to a filename; and
    adding the filename as an output resource in the one or more resource files.

5. The method according to claim 1, further comprising:
    expanding the software expression by collecting and analyzing symbols in the abstract syntax tree;
    splitting the software expression into a plurality of individual tasks such that a single expression is created for each task; and
    performing the plurality of individual tasks in parallel.

6. The method according to claim 5, further comprising:
    analyzing a plurality of software expressions; and
    automatically tagging at least one of the plurality of software expressions resulting in the tagged expression.

7. The method of according to claim 1, further comprising providing the serialized abstract syntax tree to the cloud-native high-performance computing environment a resource file.

8. One or more computer storage media including instructions, which when executed by a processor, cause the processor to:
    receive a tagged expression indicating that a translation of a software expression from a user API call to an API call of an SDK is to be performed, the SDK being associated with a cloud-native high-performance computing environment;
    process an abstract syntax tree associated with the software expression by replacing symbols in the abstract syntax tree with respective variables, replacing a return statement in the abstract syntax tree with a serialization instruction to write a result to local storage, and serializing the processed abstract syntax tree; and
    provide the serialized abstract syntax tree and one or more resource files to the cloud-native high-performance computing environment for execution.

9. The one or more computer storage media of claim 8, wherein the instructions, which when executed by a processor, cause the processor to:
    create batch job to execute at least a portion of the serialized abstract syntax tree in the cloud-native high-performance computing environment;
    create a storage container associated with the batch job; and
    create a specialized resource container associated with the one or more resource files.

10. The one or more computer storage media of claim 9, wherein the batch job is a multitask batch job.

11. The one or more computer storage media of claim 8, wherein the instructions, which when executed by a processor, cause the processor to:
    serialize output associated with the return statement to a filename; and
    add the filename as an output resource in the one or more resource files.

12. The one or more computer storage media of claim 8, wherein the instructions, which when executed by a processor, cause the processor to:
    expand the software expression by collecting and analyzing symbols in the abstract syntax tree;
    split the software expression into a plurality of individual tasks such that a single expression is created for each task; and
    perform the plurality of individual tasks in parallel.

13. The one or more computer storage media of claim 12, wherein the instructions, which when executed by a processor, cause the processor to:
analyzing a plurality of software expressions; and
automatically tag at least one of the plurality of software expressions resulting in the tagged expression.

14. The one or more computer storage media of claim 8, wherein the instructions, which when executed by a processor, cause the processor to provide the serialized abstract syntax tree to the cloud-native high-performance computing environment a resource file.

15. A system, comprising:
one or more hardware processors configured by machine-readable instructions to:
receive a tagged expression indicating that a translation of a software expression from a user API call to an API call of an SDK is to be performed, the SDK being associated with a cloud-native high-performance computing environment;
process an abstract syntax tree associated with the software expression, the processing including replacing symbols in the abstract syntax tree with respective variables, replacing a return statement in the abstract syntax tree with a serialization instruction to write a result to local storage, and serializing the processed abstract syntax tree; and
provide the serialized abstract syntax tree and one or more resource files to the cloud-native high-performance computing environment for execution.

16. The system according to claim 15, wherein the one or more hardware processors are further configured by machine-readable instructions to:
create batch job to execute at least a portion of the serialized abstract syntax tree in the cloud-native high-performance computing environment;
create a storage container associated with the batch job; and
create a specialized resource container associated with the one or more resource files.

17. The system according to claim 16, wherein the batch job is a multitask batch job.

18. The system according to claim 15, wherein the one or more hardware processors are further configured by machine-readable instructions to:
serialize output associated with the return statement to a filename; and
add the filename as an output resource in the one or more resource files.

19. The system according to claim 15, wherein the one or more hardware processors are further configured by machine-readable instructions to:
expand the software expression by collecting and analyzing symbols in the abstract syntax tree;
split the software expression into a plurality of individual tasks such that a single expression is created for each task; and
perform the plurality of individual tasks in parallel.

20. The system according to claim 19, wherein the one or more hardware processors are further configured by machine-readable instructions to:
analyze a plurality of software expressions; and
automatically tag at least one of the plurality of software expressions resulting in the tagged expression.

* * * * *